Dec. 10, 1963
E. R. BRANDT ET AL
3,113,495
PHOTOGRAPHIC APPARATUS
Filed May 27, 1960
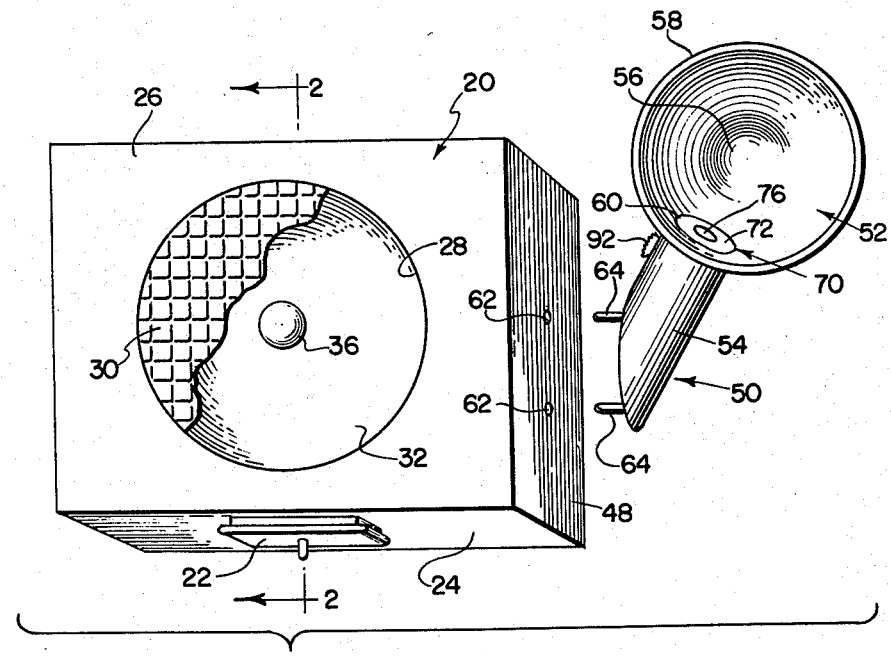
FIG. 1
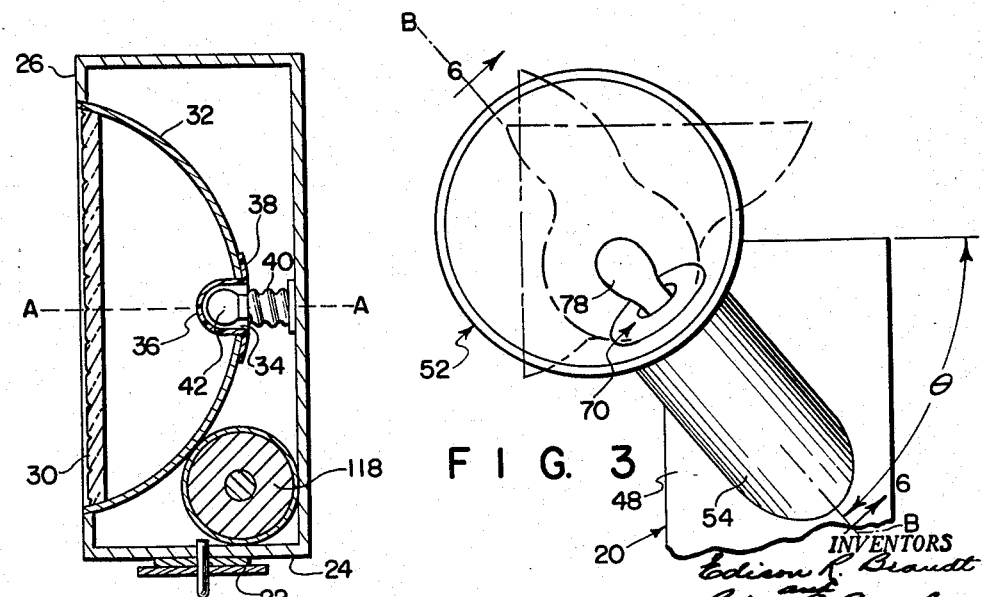
FIG. 2
FIG. 3
INVENTORS
Edison R. Brandt
BY Robert C. Casselman
Brown and Mikulka
and
Robert J. Schiller
ATTORNEYS Dec. 10, 1963  E. R. BRANDT ET AL  3,113,495
PHOTOGRAPHIC APPARATUS
Filed May 27, 1960  2 Sheets-Sheet 2

INVENTORS
Edison R. Brandt
Robert C. Casselman
BY
Broward Miculka
Robert J. Schiller
ATTORNEYS ated Dec. 10, 1963

**3,113,495
PHOTOGRAPHIC APPARATUS**
Edison R. Brandt, Marblehead, and Robert C. Casselman, Auburndale, Mass., assignors to Polaroid Corporation, Cambridge, Mass., a corporation of Delaware
Filed May 27, 1960, Ser. No. 32,292
3 Claims. (Cl. 95—11.5)

This invention relates to photography and more particularly to photographic illumination.

Where the level of ambient illumination is inadequate for properly exposing a photographic emulsion, supplemental illumination is required. In recognition of this need, many prior art devices have been produced. Among these devices has been a flash gun which usually includes means for synchronizing the flash with the exposure effected by a camera shutter. The flash generally results either from a high voltage discharge through a tube of rarefied gas or from the chemical reaction of a finely divided filament with an oxidizer in a lamp bulb. The former type of flash tube is quite expensive and requires a correspondingly costly high voltage source; the latter type of flash bulb, hereinafter referred to as a vaporizable flash bulb, is not re-usable, being expended with one flash. Thus, the incandescent bulb, both comparatively inexpensive and re-usable, has been investigated as a source of flash illumination for photography.

However, where the flash gun is a low voltage device (i.e., one employing peak voltages of rarely more than forty volts), the maximum illumination available from an incandescent source is substantially less than the light intensity obtainable from the chemical, i.e., vaporizable, type of flash bulb. Consequently, an object of this invention is to provide a compact and inexpensive flash lamp capable of producing a plurality of light flashes at high intensities, low intensities, or both.

Another object of this invention is to provide a combination flash device having a low intensity light source and a high intensity light source operable separately or in unison from a common power source.

Another object of this invention is to provide, in a photoflash unit which may be detachably secured to a camera, means for supporting a conventional incandescent lamp bulb, means for supporting a conventional vaporizable flash lamp bulb, and electrical means for energizing said flash lamp bulb to a normal operating level and for energizing said incandescent lamp bulb to an overload charge relative to its normal operating characteristics in synchronism with the effectuation of an exposure by said camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a front perspective schematic view, partly in fragment and partly exploded, of one embodiment of the invention;

FIG. 2 is a schematic cross section of the embodiment of FIGURE 1 taken along the line 2—2;

FIG. 3 is a fragmentary, schematic side view of the embodiment of FIGURE 1, showing the movable reflecting means and indicating the positions through which it is movable;

Figure 4:
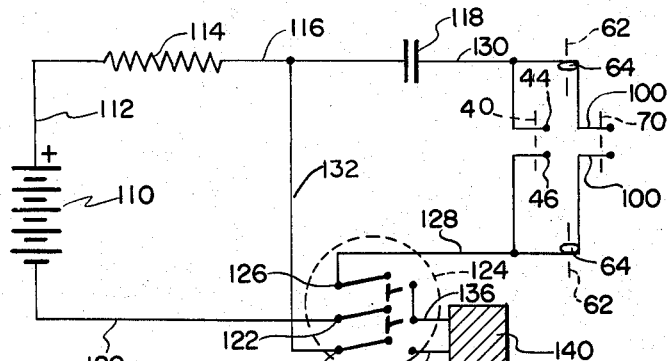
FIG. 4 is a diagrammatic circuit showing one form of the disposition of the electrical elements of the embodiment of FIGURE 1.

In general, this invention contemplates a compact, lightweight, flash-lighting apparatus of the type characterized as battery-capacitive flash lamps which may be detachably mounted by suitable mounting means upon a camera having an integral flash-synchronizing means such as a shutter actuated discharge switch. The flash apparatus, in common with other flash units well known in the art, comprises a housing or casing for supporting and protecting the electrical elements of the apparatus and means for mounting the apparatus upon a camera such that the housing is in a substantially fixed alignment relative to the field of view of the camera. The flash apparatus also includes at least a pair of reflecting means and a pair of lamp-bulb holding means associated respectively therewith. One of the reflecting means, in the form shown, is substantially fixed relative to the housing and its associated lamp-bulb holding means is adapted to support an incandescent lamp-bulb in operative relation to the reflecting means. The other of the reflecting means is preferably mounted for movement with respect to the housing for directing light in a plurality of directions, and the lamp-bulb holding means associated therewith is adapted to releasably retain a flash lamp bulb of the vaporizable filament type in operative relation to this latter reflecting means. Also included in the unit are means for initiating operation of lamp bulbs installed in the respective lamp-bulb holding means. In the preferred form, therefore, the flash apparatus includes battery-capacitive electrical elements such as a power source or battery, an electrically capacitive element, a resistive element, and means for connecting the unit with a synchronizing switch in the camera.

Referring now to the drawings, there is shown in FIGURE 1 a flash unit comprising a substantially hollow casing means such as housing 20 for enclosing and supporting electrical elements of the flash apparatus. Housing 20 may be formed of any suitable material, preferably an electrically nonconducting substance such as substantially rigid artificial polymers, vulcanized rubber, or the like. As a means for mounting housing 20 upon a camera, there is provided a mounting foot or jack 22 disposed exteriorly of the housing upon bottom wall 24 thereof. Jack 22 is constructed and shaped for insertion into the usual mounting clip of a camera for firmly and releasably retaining housing 20 in a substantially fixed relation to the camera, and also for electrically completing a circuit between the electrical elements contained within housing 20 and a shutter synchronized switch means known in the art and contained within the camera. The structural details of jack 22 are preferably similar to those which comprise the mounting foot shown in co-pending U.S. application Serial No. 743,657, filed June 23, 1958 by E. R. Brandt, now Patent No. 3,077,534.

Housing 20 also includes front wall 26 disposed at an angle, such as a right angle, to wall 24. Wall 26 includes therein opening 28 which is preferably circular. Means such as element 30 are provided as an optically transparent, protective cover disposed across opening 28. Element 30 may comprise a collimating lens, a planar sheet, or as shown in FIGURE 1, a member having a lenticular surface. Element 30 may be constructed of any suitable material such as glass, but it is preferably composed of a clear, hard, plastic material such as methyl methacrylate, thus minimizing the possibility of breakage, reducing the cost of construction, and easing the problem of fabrication.

Associated with opening 28 is a reflecting means such as first conoidal or cup-shaped reflector 32, the largest diameter of which is preferably attached to element 30 to form an integral unit therewith. Reflector 32 is preferably ellipsoidal and is provided with a circular aperture 34 adjacent its vertex. Other geometrical shapes of the so-called solids of revolution form, such as semicircular or paraboloidal, may be given to the reflector which is generally constructed of metal or other conventional material and is provided at its inner or concave configuration with a highly reflecting surface. Reflector 32 is preferably disposed with its axis of revolution A—A colinear with any optical axis that element 30 may possess by virtue of its lens-like structure. Jack 22 and first reflector 32 are so disposed relative to one another and to housing 20 that when jack 22 is inserted in its usual position in a mounting clip on a camera, axis A—A is substantially parallel with the optical axis of the camera's lens system.

Aperture 34 at the vertex of the reflector, in the form shown, is circular and substantially smaller in diameter than the circular diameter of element 30. Disposed in aperture 34 and extending therethrough into the concavity of the reflector is a light-diffusing member 36. This light-diffusing member preferably takes the form of a roughly semispherical nipple provided peripherally about its open end with a flange 38 dimensioned to retain member 36 in contact with the periphery of aperture 34. Light-diffusing properties of member 36 are imparted by preferably forming the member of an optically translucent, diffusing substance such as frosted glass or an appropriate polymeric plastic.

Disposed within the open end of light-diffusing member 36 is a first lamp-bulb holding means 40 which is preferably adapted to receive a miniature, threaded base type of bulb as shown at 42. Aperture 34 and first lamp-bulb holding means 40 are so located relative to one another that when bulb 42 is in operative position in holding means 40, the bulb extends well into member 36 and therefore is inside the concavity of the reflector. Bulb 42 is of the tungsten-filament, incandescent type, well known in the art, which preferably requires a low voltage to exhibit its normal operating characteristics. Electrical contacts are formed and located in the usual manner between bulb 42 and lamp-bulb holding means or socket 40, the appropriate contacts being shown schematically in FIG. 4 at 44 and 46.

Housing 20 also includes side wall 48 which is disposed at angles with respect to both bottom wall 24 and front wall 26. For the sake of simplicity, these angles are both right angles in the embodiment shown. Releasably mounted on side wall 48 is a second reflecting means indicated generally by the reference numeral 50. Member 50, in the form shown, comprises a movable means for reflecting and directing light, such as secondary reflector 52, and also includes means such as cylindrical portion 54 for connecting and supporting second reflector 52 in operative relation to housing 20. In the preferred embodiment, reflector 52 comprises an open-ended, hollow element having a roughly bowl-shaped configuration with a vertex 56 at one end, the open end of the element having a periphery 58 which is preferably in a single plane. The interior of the second reflector is, of course, provided with a convex surface having a high albedo. Disposed adjacent vertex 56 and to one side thereof is a means, such as circular aperture 60, for providing a pivotal axis for reflector 52. Aperture 60 is so disposed that rotation of reflector 52 about pivotal axis B—B through the center of aperture 60 moves the plane of periphery 58 through three mutually perpendicular directions.

Portion 54 is preferably formed as a substantially hollow cylinder and is so disposed with respect to reflector 52 that its cylindrical axis is colinear with axis B—B through the center of aperture 60 of the second reflector. One end of cylindrical portion 54, which is open, is therefore located immediately adjacent aperture 60, the other end of cylindrical portion 54 being adapted for mounting upon housing 20. Means are provided for mechanically mounting and electrically connecting reflecting means 50 with housing 20 and the elements contained therein. In the form shown, the connecting means comprises a pair of spaced apertures 62 disposed in and extending through side wall 48. The connecting means also comprises a pair of metallic, electrically conducting prongs or plugs 64 which are so dimensioned and disposed at the closed end of cylindrical element 54 as to be simultaneously insertable in corresponding apertures 62. It should be noted that cylindrical member 54 and associated reflector 52 may be mounted to form a permanent integral unit with housing 20. However, in the preferred embodiment, second reflecting means 50 is formed as a separable unit which may be activated by inserting plugs 64 into apertures 62 and is also, therefore, removable for storage so that the housing unit and reflector 32 may be used alone. When plugs 64 are fully inserted into the corresponding apertures, cylindrical portion 54 is firmly but releasably retained in juxtaposed relation to side wall 48, axis B—B being disposed at a first predetermined angle to axis A—A of first reflector 32 and at a second predetermined angle with respect to the plane of front wall 26. In the preferred embodiment the first predetermined angle is approximately 55°, and the second predetermined angle is approximately 45°. This angular relation between the axis and the front wall provides that reflector 52 is so mounted that by manual manipulation thereof about the single axis B—B, reflector 52 is movable through at least three positions (two of which are shown in broken lines and the third being shown in solid line identified by the reference numeral 52 in FIG. 3) wherein light from reflector 52 is directed in three corresponding directions which are mutually and approximately perpendicular to one another. One of these three directions is substantially parallel with the direction of light directed by first reflector 32 along axis A—A.

Figure 5:
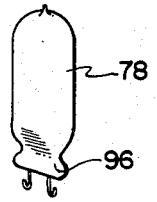
FIG. 5 is illustrative of one form of flash bulb for which the movable reflector is particularly well adapted.
Figure 6:
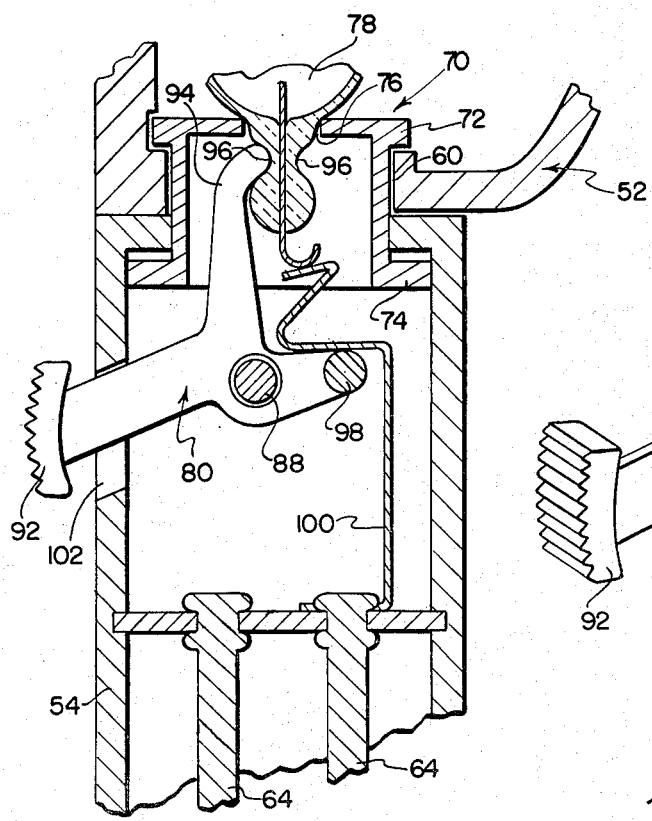
FIG. 6 is a fragmentary, diagrammatic cross section taken along the line 6—6 of FIG. 3.

Disposed within aperture 60 is a second lamp-bulb holding means 70. Lamp-bulb holding means 70 is preferably provided as a cylindrical socket having a first flange 72 adjacent one end and a second flange 74 adjacent the other end. Socket 70 is dimensioned to fit snugly within aperture 60 with flange 72 extending interiorly of reflector 52, thereby holding the socket within the reflector. Flange 74 extends interiorly of the open end of cylindrical portion 54 for locking the socket therein. It will thus been seen that while reflector 52 is rotatable about socket 70, it is nevertheless firmly affixed to the open end of cylindrical portion 54. Socket 70 is provided with an aperture 76 surrounded by flange 72, aperture 76 being so shaped as to be adapted to receive the base of a miniature type of vaporizable flash bulb 78 such as the AG-1 (shown in FIG. 5 for the purposes of illustration only) produced by both Sylvania Electric Products Company and General Electric Company.

Figure 7:
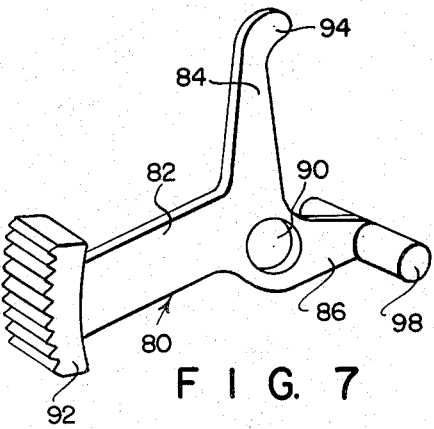
FIG. 7 is a perspective view of one form of a bulb-locking and ejecting element of the embodiment of FIG. 6.

Also disposed within the open end of cylindrical portion 54 is a means such as member 80 for releasably locking and for ejecting bulb 78 from aperture 76. As shown in FIG. 7, member 80 is preferably formed as a Y-shaped element having a first arm 82, a second arm 84, and a third arm 86 all preferably in a common plane. Element 80 is mounted for rotation in the common plane about suitable bearing means such as axle 88 which is mounted transversely of axis B—B and extending interiorly from one side to the other of cylindrical portion 54. Element 80 is provided adjacent the common juncture of its three arms with an aperture or hole 90 in which axle 88 is disposed. Arm 82 is provided at the free end thereof with a manually engageable portion 92. Arm 84 is provided adjacent the free end thereof with a hook or engaging portion 94 adapted to releasably engage groove 96 at the base of bulb 78. Arm 86 is provided at the free end thereof with means, such as rod 98, for effecting the ejection of bulb 78. Rod 98, in the form shown, is disposed substantially perpendicularly to the plane of rotation of element 80 about axle 88.

Also disposed within the interior of cylindrical portion 54 are means for providing electrical contact with the base terminals of flash bulb 78. Such means are provided in the form of resilient leads 100 (only one of which is shown) which are in spaced-apart relation. One end of each of leads 100 is respectively connected to a plug 64, the other end of each respective lead 100 being located adjacent aperture 76 so that insertion of bulb 78 into the aperture causes the base electrodes of the bulb to contact the respective leads 100 depressing the leads slightly and stressing them. Axle 88 is preferably disposed such that manually engageable portion 92 of member 80 extends through aperture 102 in a side of cylindrical portion 54 so as to be manually engageable outside of the cylinder; arm 84 is so disposed adjacent aperture 76 that upon insertion of bulb 78 into the aperture, portion 94 is engageable with groove 96; and arm 86 is located adjacent leads 100 such that upon the depression of the leads by insertion of the bulb, the leads exert pressure against rod 98, thereby rotating member 80 so that engaging portion 94 is firmly brought into and retained in engagement with groove 96.

In operation, pressure exerted by an operator against manually engageable portion 92 rotates member 80 about axle 88, forcing rod 98 against leads 100 to exert resilient pressure against the base of bulb 78. Simultaneously, the rotation of member 80 moves engageable portion 94 out of engagement with groove 96, thereby allowing the resilient pressure of leads 100 to move bulb 78 axially out of socket 76 and freeing the socket for the next bulb insertion.

The invention includes means for powering both light sources substantially simultaneously. One example is the circuit shown schematically in FIG. 4. As may be seen, there is included an electrical power source such as battery 110. One terminal of the battery, such as the positive terminal, is connected by means such as lead 112 to an electrically resistive element, such as resistor 114. The resistor in turn is connected by means such as lead 116 to one side of an electrically capacitive element such as condenser 118. The negative terminal of the battery is connected by lead 120 to one element 122 of a mounting-switch means which is generally indicated by the reference numeral 124. A second element 126 of switch means 124 is connected by lead 128 to both contact 46 of bulb socket 40 and one aperture 62 for connection with the corresponding plug 64 and lead 100 to socket 70. The other side of condenser 118 is connected by lead 130 to contact 44 of bulb socket 40 and to the other of apertures 62 for connection with the other of plugs 64 at its corresponding lead 100. It will be seen that apertures 62 and plugs 64 have been indicated schematically in FIG. 4 in order to indicate the releasable nature of the connection. It will also be seen that the switch means 124, battery 110, resistor 114, condenser 118, and bulb socket 40 are all connected in series and thus constitute a charging circuit. This circuit insures that condenser 118 cannot be charged by the battery through the resistor unless switch means 124 is closed and when bulb 42 is inserted in bulb socket 40, thereby completing the circuit between contacts 44 and 46. Because socket 70 and leads 112 are connected in parallel with lamp socket 40, the insertion of bulb 78 into socket 70 when switch means 124 is closed also insures the charging of the condenser by the battery.

The one side of condenser 118 is also connected by means such as lead 132 to a third element 134 of switch means 124, thus comprising a portion of a firing circuit. Connected to switch means 124 by means such as lead 136, which is connectable with elements 122 and 126, and lead 138 which is connectable with element 134, is a shutter actuated, flash-synchronizer switch 140 of a camera upon which the unit is adapted to be mounted.

In the operation of the invention, housing 20 is mounted upon the camera by insertion of jack 22 into the camera mounting clip. As known in the art, the engagement of the jack with the clip both completes the charging circuit and also completes a circuit which includes flash-synchronizer switch 140 of the camera, thereby allowing condenser 118 to be discharged upon actuation of flash-synchronizer switch 140 by operation of the camera shutter. Thus, the insertion of jack 22 into the mounting clip amounts to closure of switch means 124. Additionally, the engagement of jack 22 and the camera mounting clip mechanically aligns housing 20 with respect to the camera so that axis A—A is substantially parallel with the optical axis of the camera lens system. Insertion of plugs 64 into apertures 62 electrically and mechanically connects a second reflector 52 to housing 20. Insertion of appropriate lamp bulbs in sockets 34 and 70 provides light sources actuatable by discharge of condenser 118 upon operation of switch 140. Reflector 52 is movable through a plurality of positions wherein it may either direct light along an axis substantially parallel to A—A, thereby directly reinforcing light coming from reflector 32, or may direct light perpendicularly to axis A—A for providing diffuse "bounce" lighting in support of light coming from reflector 32.

As may be seen from FIG. 4, actuation of switch 140 discharges condenser 118 simultaneously through both incandescent bulb in socket 40 and the vaporizable flash bulb in socket 70. In the preferred embodiment, the values of the various circuit elements are selected so that the discharge of the condenser momentarily brings the filament of the incandescent bulb to a temperature which is well above its normal operating temperature, but somewhat less than the melting point of the filament. The normal operating temperature is herein defined as that limited range of temperatures at which the filament is maintained when subject to the normal, steady-state current and voltage in accordance with the manufacturer's rated specifications for the lamp bulb. A curve of filament temperature against discharge time for incandescent lamp bulbs shows variations according to such parameters as the physical dimensions of the filament, the bulb atmosphere, the charging voltage, the total capacitance of the circuit, the battery wattage and others. The preferred circuit, therefore, comprises electrical elements the values of which must meet two criteria. The values must be sufficient to provide a discharge adequate for initiating the reaction which produces a flash from a vaporizable flash-lamp bulb, and they must be such that the desired characteritsics, such as time delay from discharge to peak brightness, flash duration, maximum brightness obtainable, etc., of the flash are obtainable from the incandescent lamp bulb employed.

To meet these criteria, a preferred embodiment of the circuit employs a relatively high amperage, low voltage type of miniature incandescent bulb 42, such as the General Electric No. 428, rated at 0.25 ampere, 12.5 volts. The preferred form of the vaporizable flash-lamp bulb is the AG-1 type heretofore identified for use with such bulbs. Condenser 118 preferably is in the form of a well known cylindrical, electrolytic condenser for both compactness and reliability in operation. A preferred embodiment of the invention employs an 860 microfarad (−10, +40% at 10 cycles) 50 WVDC electrolytic condenser. Battery 110, the power source of the circuit, is preferably of the 45-volt type such as the No. 460 battery manufactured by Union Carbide Company, under the "Eveready" trademark. Resistor 114 is preferably about 1000 ohms, 0.5 watt, thereby allowing the preferred condenser a total recharge time of somewhat less than five seconds.

Because the illumination characteristics of levels required by the operator of a camera vary over an extremely wide range, a very high light level is obtainable by simultaneously igniting bulb 78 and reaching a momentary peak overload on bulb 42 while directing the light from both bulbs in substantially parallel directions. The total illumination of the photographic subject by the light from the two bulbs is reduceable to a somewhat lower level by rotation of reflector 52 such that light from bulb 78 is directed perpendicularly to the direction from the flash device to the photographic subject, thus providing "bounce" lighting which varies in accordance with the reflectivity of the surface, such as the ceiling or wall, toward which light from reflector 52 is directed. Minimum levels of illumination may be obtained by employing only the flash from bulb 42. This may be accomplished simply by not providing a bulb 78 for socket 70 or by the total removal of plugs 64 from respective apertures 62, thereby taking the vaporizable flash lamp out of the circuit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photoflash device for use with a camera having a flash synchronizing circuit including an actuating switch, said device comprising, in combination: a housing, first reflecting means fixedly disposed within said housing, a low-voltage, incandescent filament lamp bulb fixedly mounted with respect to said housing and arranged to have light therefrom reflected by said first reflecting means, a base portion, second reflecting means movably mounted upon said base portion, a vaporizable filament lamp bulb fixedly mounted with respect to said base portion and arranged to have light therefrom reflected by said second reflecting means, means for detachably mounting said housing upon said camera in fixed relation thereto, means for detachably mounting said base portion upon said housing in fixed relation thereto, means for coupling said incandescent filament bulb in said circuit in response to mounting said housing upon said camera, means for coupling said vaporizable filament bulb in parallel circuit relation with said incandescent filament bulb in response to mounting said base portion upon said housing, and means providing a momentary power discharge to both of said bulbs upon actuation of said switch, said power discharge having a magnitude sufficient both to provide an overload with respect to the normal operating characteristics of said low-voltage, incandescent filament bulb, thereby producing a relatively low intensity light pulse, and an ignition charge with respect to said vaporizable filament bulb, thereby producing a relatively high intensity light pulse.

2. A photoflash device for use with a camera having a flash synchronizing circuit including an actuating switch, said device comprising, in combination: a housing, first reflecting means fixedly disposed within said housing, a low-voltage, incandescent filament lamp bulb fixedly mounted with respect to said housing and arranged to have light therefrom reflected by said first reflecting means, means for detachably mounting said housing upon said camera in fixed relation thereto, means for coupling said incandescent filament bulb in said circuit in response to mounting said housing upon said camera, an electrical receptacle on said housing, a base portion, second reflecting means movably mounted upon said base portion, a vaporizable filament lamp bulb fixedly mounted with respect to said base portion and arranged to have light therefrom reflected by said second reflecting means, electrical contact means fixedly extending from said base portion and adapted to be releasably inserted in said electrical receptacle, whereby said base portion is mounted upon said housing and fixed with respect thereto, means coupling said vaporizable filament bulb, through said electrical contacts and receptacle, in parallel circuit relation with said incandescent filament bulb, and means providing a momentary power discharge to both of said bulbs upon actuation of said switch, said power discharge having a magnitude sufficient both to provide an overload with respect to the normal operating characteristics of said low-voltage, incandescent filament bulb, thereby producing a relatively low intensity light pulse, and an ignition charge with respect to said vaporizable filament bulb, thereby producing a relatively high intensity light pulse.

3. A photoflash device for use with a camera having a flash synchronizing circuit including an actuating switch, said device comprising, in combination: a housing, first reflecting means fixedly disposed within said housing, a low-voltage, incandescent filament lamp bulb fixedly mounted with respect to said housing and arranged to have light therefrom reflected by said first reflecting means, means for detachably mounting said housing upon said camera in fixed relation thereto, means for coupling said incandescent filament bulb in said circuit in response to mounting said housing upon said camera, an electrical receptacle on said housing, a base portion, second reflecting means movably mounted upon said base portion, a vaporizable filament lamp bulb fixedly mounted with respect to said base portion and arranged to have light therefrom reflected by said second reflecting means, electrical contact means fixedly extending from said base portion and adapted to be releasably inserted in said electrical receptacle, whereby said base portion is mounted upon said housing and fixed with respect thereto, means coupling said vaporizable filament bulb, through said electrical contacts and receptacle, in parallel circuit relation with said incandescent filament bulb, an electrically capacitive element, an electrical power supply, means for charging said capacitive element by said power supply to a level constituting both an overload with respect to the normal operating characteristics of said incandescent filament bulb and at least an ignition charge with respect to said vaporizable filament bulb, and means for discharging said capacitive element through said incandescent filament bulb, thereby producing a relatively low intensity light pulse, in response to actuation of said switch when said housing is mounted on said camera, and through both said incandescent and said vaporizable filament bulbs, thereby producing a relatively high intensity light pulse, in response to actuation of said switch when said base portion is mounted on said housing and the latter is mounted on said camera.

References Cited in the file of this patent
UNITED STATES PATENTS

| | | |
|---|---|---|
| 2,006,007 | Zimmer | June 25, 1935 |
| 2,290,264 | Wuerfel | July 21, 1942 |
| 2,622,496 | Owens | Dec. 23, 1952 |

FOREIGN PATENTS

| | | |
|---|---|---|
| 198,384 | Germany | May 13, 1908 |